July 7, 1964 — R. R. HANSON — 3,139,736
VEHICLE AIR-CONDITIONING UNITS
Filed May 14, 1962 — 5 Sheets-Sheet 2

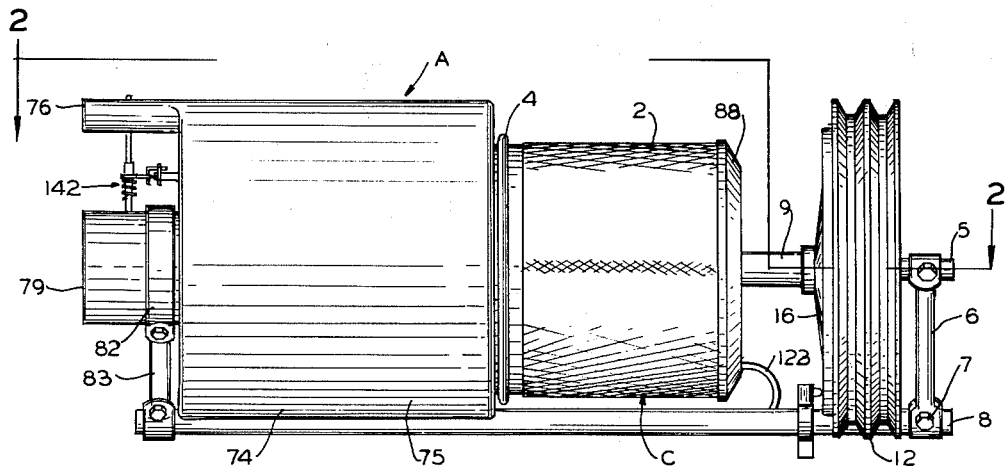

INVENTOR.
ROY R. HANSON

INVENTOR.
ROY R. HANSON
BY *Alfred W Petchaft*

ATTORNEY

July 7, 1964

R. R. HANSON 3,139,736

VEHICLE AIR-CONDITIONING UNITS

Filed May 14, 1962

INVENTOR.
ROY R. HANSON

BY Alfred W. Petchaft

ATTORNEY

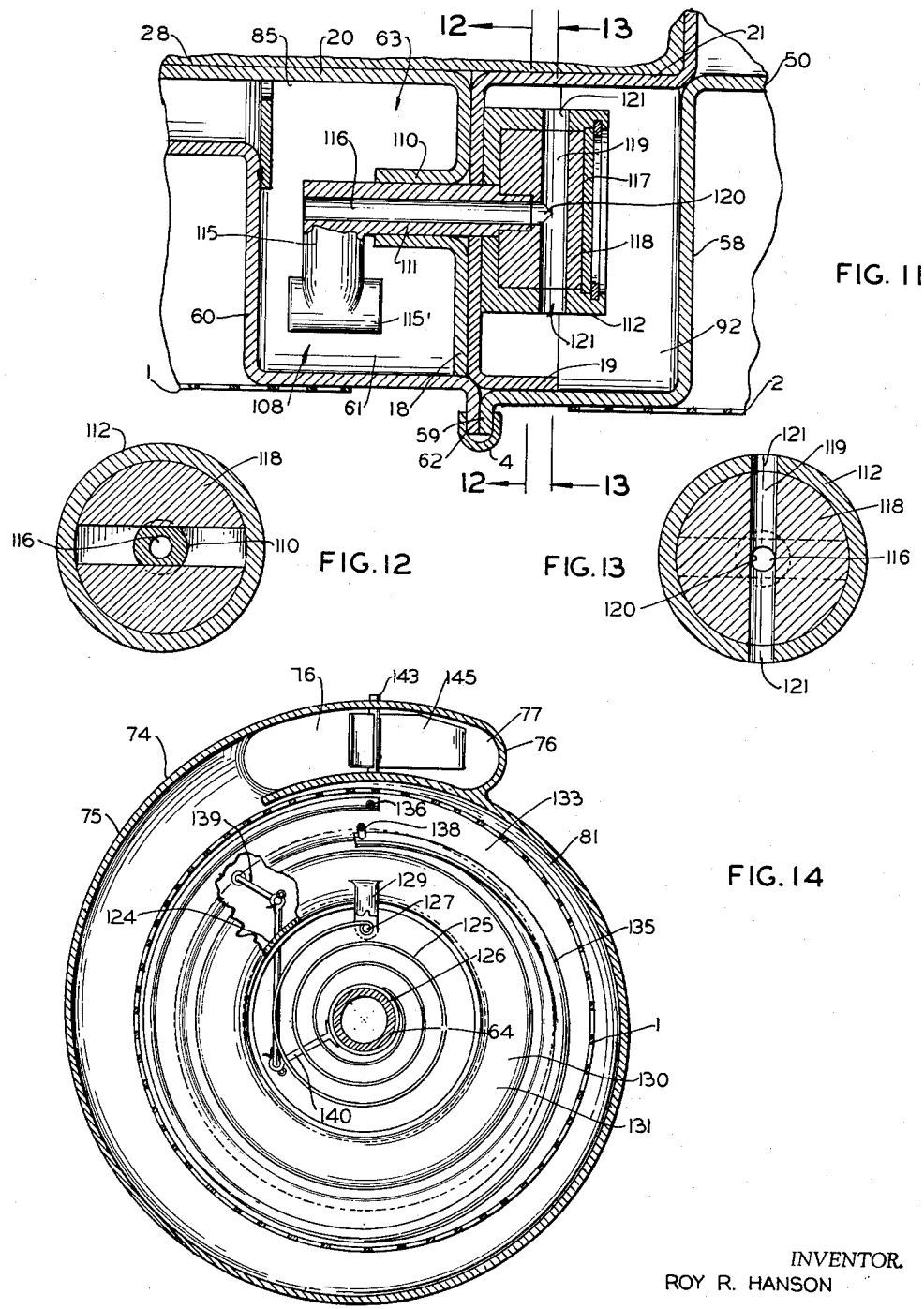

United States Patent Office

3,139,736
Patented July 7, 1964

3,139,736
VEHICLE AIR-CONDITIONING UNITS
Roy R. Hanson, 155 Cumberland Drive, Maryland Heights, Mo., assignor of one-fourth to William H. Anderson, Glencoe, Mo., one-fourth to Joseph H. Schierman and one-fourth to George A. Blase, both of St. Louis County, Mo.
Filed May 14, 1962, Ser. No. 194,296
17 Claims. (Cl. 62—180)

This invention relates in general to certain new and useful improvements in refrigerating equipment and, more particularly, to air-conditioning units for automotive vehicles and the like.

It is the primary object of the present invention to provide an air-conditioning system for automotive vehicles and the like which combines the various components and controls forming part of the system in a compact self-contained unit.

It is another object of the present invention to provide an air-conditioning system of the type stated which will effectively maintain a regulated and constant temperature and air flow in the media to be conditioned.

It is an additional object of the present invention to provide a control system for use with the air-conditioning system which enables the evaporator to operate in a full-flooded condition and the condenser to operate on a dry-wall basis.

It is also an object of the present invention to provide a control system which operates on a gas refrigerant weight to liquid refrigerant weight basis for accurately maintaining accurate operating control over the evaporator and condenser forming part of the air-conditioning system.

It is still another object of the present invention to provide an air-conditioning system of the type stated which requires one air volume control, one temperature control, one high-side capacity control, and one low-side capacity control.

It is a further object of the present invention to provide an air-conditioning system of the type stated which is rigid in construction, inexpensive to manufacture, and economical in operation.

With the above and other objects in view, my invention resides in the novel features of form, construction, arrangement, and combination of parts presently described and pointed out in the claims.

In the accompanying drawings (five sheets):

FIG. 1 is a side elevational view of the air-conditioning system constructed in accordance with and embodying the present invention;

FIG. 2 is a sectional view taken along line 2—2 of FIG. 1;

FIG. 3 is a right-side elevational view of the air-conditioning system;

FIG. 4 is a left-side elevational view of the air-conditioning system;

Figure 5:
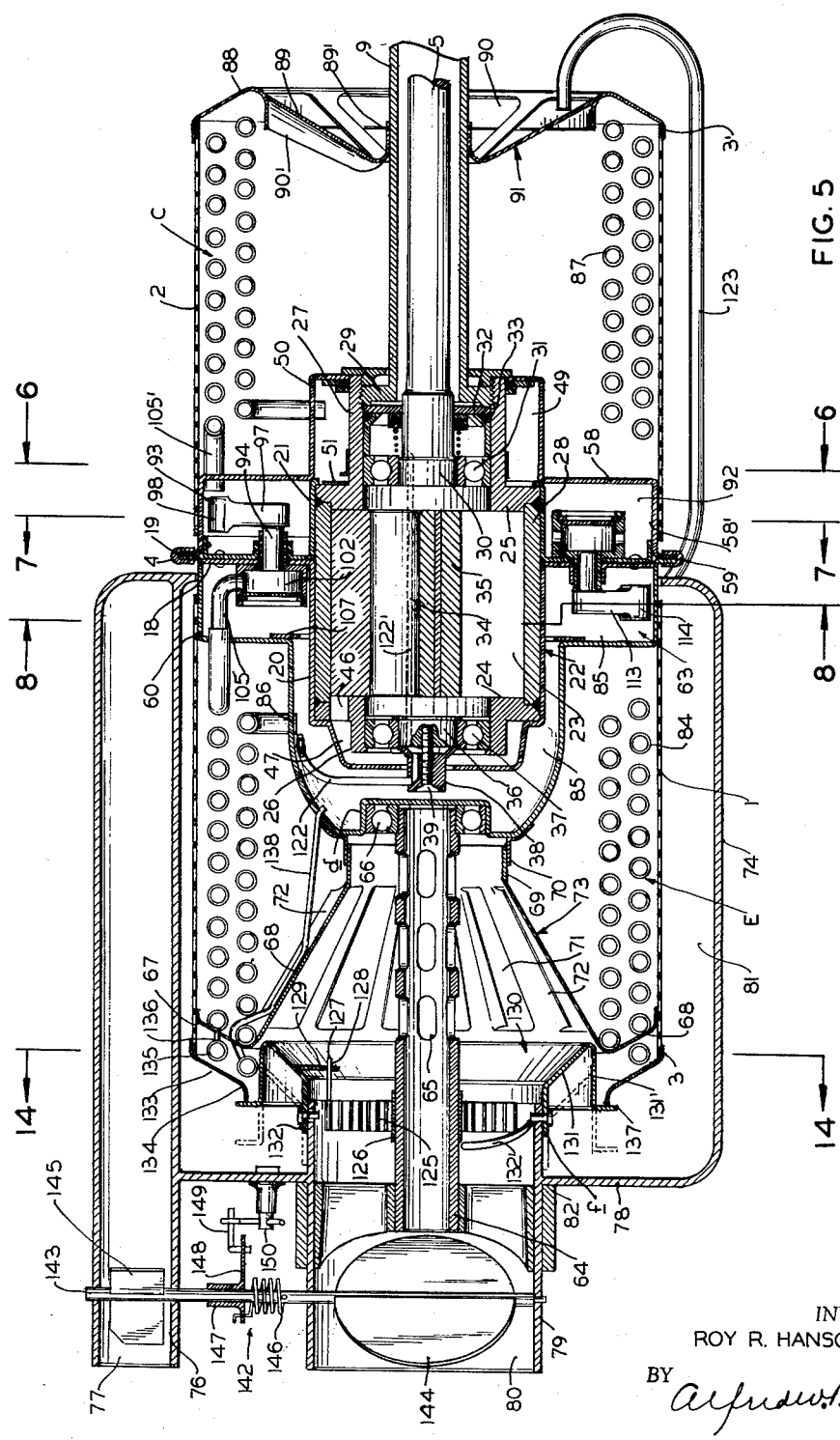
FIG. 5 is a fragmentary sectional view taken along line 5—5 of FIG. 2.
Figure 6:
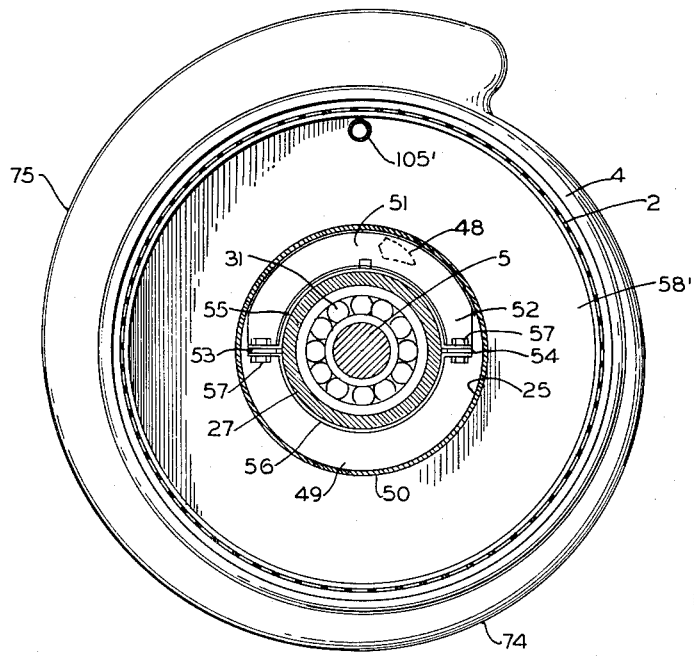
Figure 7:
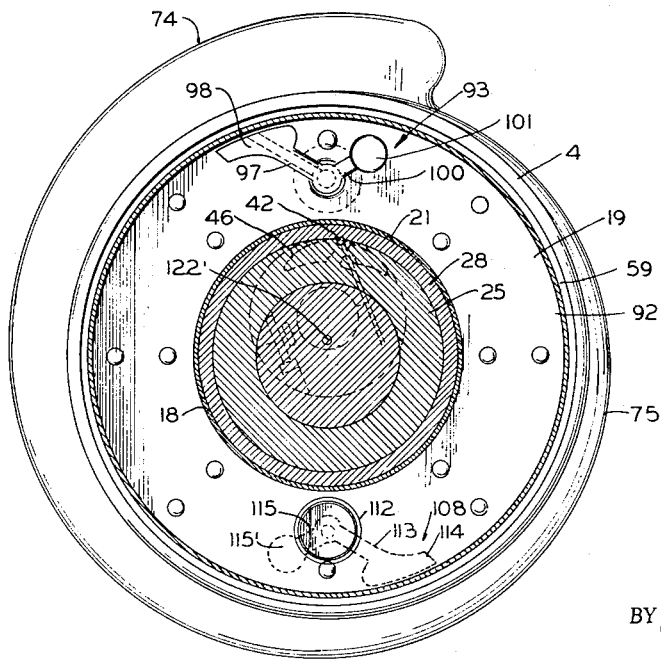
Figure 10:
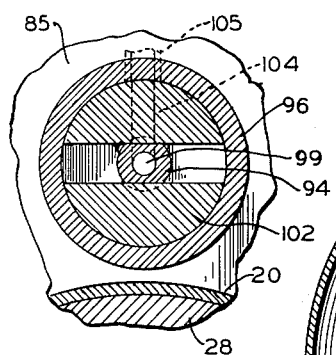
Figure 8:
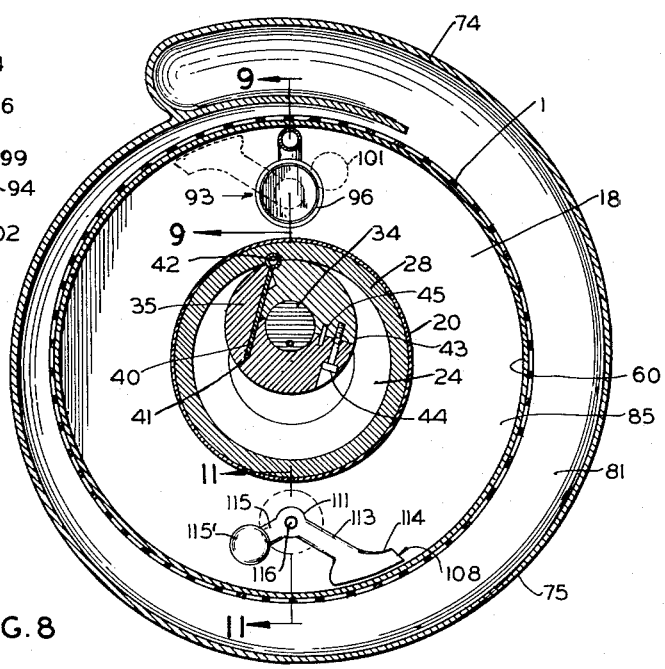
Figure 9:
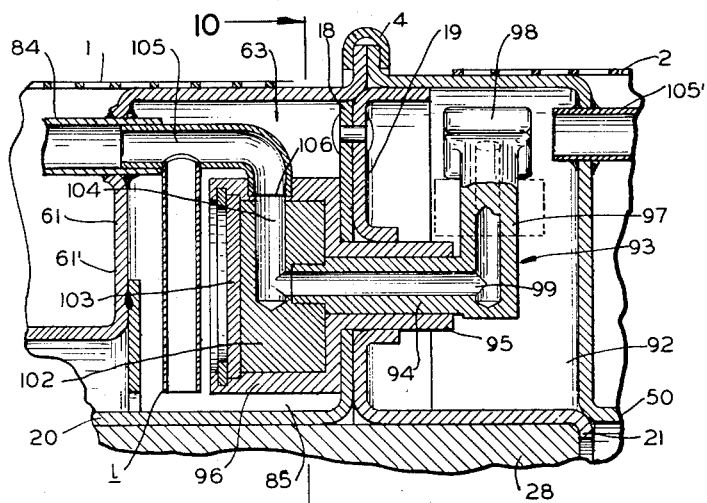

FIGS. 6, 7, and 8, are vertical sectional views taken along lines 6—6, 7—7, and 8—8, respectively, of FIG. 5;

FIG. 9 is a fragmentary sectional view taken along line 9—9 of FIG. 8;

FIG. 10 is a fragmentary sectional view taken along line 10—10 of FIG. 9;

FIG. 11 is a fragmentary sectional view taken along line 11—11 of FIG. 8;

FIGS. 12 and 13 are fragmentary sectional views taken along lines 12—12 and 13—13, respectively, of FIG. 11; and FIG. 14 is a vertical sectional view taken along line 14—14 of FIG. 5.

Referring now in more detail and by reference characters to the drawings, which illustrate a preferred embodiment of the present invention, A designates an air-conditioning system designed primarily for use with automotive vehicles and the like and which comprises an evaporator E having a cylindrical outer casing 1 and a condenser C having a cylindrical outer casing 2, each of which integrally includes matching outwardly extending flanges 3, 3', respectively, and which are endwise connected by means of an annular clamping ring 4. The outer evaporator casing 1 and the outer condenser casing 2 are preferably formed of a fairly rigid wire mesh material such as a stainless steel screen. A stationary support shaft 5 extends axially through the casing 2, and is suitably mounted on an upstanding support rod 6 by means of a clamp 7, the support rod 6, in turn, being rigidly secured to a mounting bar 8, substantially as shown in FIGS. 1 and 5.

Disposed around and extending axially along the stationary support shaft 5 is a rotatable quill shaft 9 which has a tapered forward end 10, reference being made to FIG. 1. Journaled on the stationary shaft 5 by means of bearings 11 is a V-belt pulley 12 having a rearwardly facing annular clutch ring 13 which is spring-biased rearwardly by means of compression springs 14. Rigidly keyed to the rotatable quill shaft 9 is a conventional electromagnetic clutch 15 including a flywheel 16 having a conventional electromagnetic coil 17 and which is adapted for operative engagement with the clutch ring 13. A conventional V-belt (not shown) can be trained about the pulley 12 and may be driven by a suitable prime mover such as an automobile engine (not shown). The electromagnetic clutch 15 can be conveniently provided with conventional control switch circuitry (not shown), including a remotely located manual control switch by which means a circuit can be completed to energize the electromagnetic coil 17. This circuitry is conventional and in no way forms part of the present invention and is, therefore, neither illustrated nor described in detail herein. The electromagnetic clutch 15 is normally disengaged and the V-belt pulley 12 is freely rotatable on the stationary shaft 5. By reference to FIG. 2, it can be seen that when the electromagnetic coil 17 is energized, it will pull into contact therewith the annular clutch ring 13 against the action of the springs 14 and thereby establish mechanical connection between the pulley 12 and the quill shaft 9 so that a rotative force is transmitted from the pulley 12 to the quill shaft 9.

Disposed within the casing 1 and extending axially therethrough are two endwise abutting sheet metal stampings 18, 19, which integrally include matching outwardly extending flanges 20, 21, which, when riveted or otherwise rigidly secured, form an internal compressor compartment 22. Mounted within the compressor compartment 22 is a compressor 23 which comprises a pair of spaced circular end plates 24, 25, each integrally including outwardly extending bosses 26, 27, which are internally bored. The circular end plates 24, 25, are annularly grooved at their inwardly presented peripheral margins for the accommodation of a cylindrical compressor casing 28. The rotatable quill shaft 9 is provided with a diametrally enlarged rearward end 29 which is exteriorly threaded for rigid securement within the boss 27. B-- means of this construction, it can be seen that the compressor casing 28 and end plates 24, 25, will rotate with the rotatable quill shaft 9. In this connection, it should also be noted that the enlarged rearward end 29 should be threaded so that it is, in effect, self-tightening within the boss 27, when the quill shaft 9 is rotated. As the stationary support shaft 5 does not rotate with the compressor 23, it is provided with a diametrally enlarged rearward end 30 which is journaled in bearings 31, the bearings 31, in turn, being mounted within the bore of the boss 27. Mounted on the enlarged rearward end 30 and abutting the enlarged end 29 of the stationary shaft 5 is a retaining plate 32 which retains a seal 33.

The stationary support shaft 5 integrally merges into an offset or eccentrically located stationary compressor rotor shaft 34 which extends through the compressor 23 and rotatably mounted thereon is a cylindrical compressor rotor 35. The offset rotor shaft 34 integrally merges into a stationary stub shaft 36 which is, in effect, a continuation of the stationary support shaft 5 and is journaled in bearings 37, the bearings 37, in turn, being mounted within the bore of the boss 26. A stuffing box 38 is rigidly secured to the rearward end of the stub shaft 36 by means of a bolt 39, all for reasons which will be presently more fully apparent.

The operation and structure of the compressor 23 is more fully described in United States Patent No. 3,001,-384, and in copending application Serial No. 102,060, filed April 10, 1961, and is, therefore, neither illustrated nor described in detail herein. However, for purposes of illustration in connection with the present invention, a brief description of the compressor 23 is set forth. By reference to FIGS. 6, 7, and 8, it can be seen that the rotor 35 is provided with a chordwise extending slot 40 which is exposed radially to the interior cylindrical surface of the casing 28, and fitted within the slot 40 is a thin flat compressor vane 41. The outer end of the vane 41 is pivotally mounted to the inwardly presented lateral surface of the end plate 24 by means of a pin 42. The rotor 35 is further axially split along an inner face 43 in order to facilitate assembly on the shaft 34 and is secured in such assembled position by means of bolts 44 and pins 45. The left end plate 24, reference being made to FIG. 5, is provided with a low-side inlet port 46 which communicates with a low-pressure gas manifold or chamber 47 formed by the stamping 18 and the left end plate 24. The end plate 25 is provided with a high-side or high-pressure discharge port 48 which communicates with a high-pressure gas manifold or chamber 49 formed by a cyindrical sheet metal stamping 50. When the gas within the compressor 23 is compressed to condenser pressure, it will force a check-valve 51 open and discharge into the high-pressure manifold 49. The check-valve 51 is preferably a somewhat resilient semi-cylindrical ring 52 which normally bears against and is disposed over the discharge aperture 48. The ring 52 is integrally formed with a pair of projecting tabs 53, 54, which are seated between a pair of semi-circular annular bands 55, 56, extending around the boss 27, the tabs 53, 54, being secured to the annular bands 55, 56, by means of bolts 57.

The sheet metal stamping 50 integrally includes a diametrally enlarged cylindrical portion 58 having an annular cylindrical side wall 58' which abuts against and lies flush with the inwardly presented surface of the casing 2 and integrally merges into an outwardly extending flange 59 which is, in turn, seated beneath the annular clamping ring 4. A matching sheet metal cylindrical stamping 60 is disposed within the outer evaporator casing 1 and integrally includes a diametrally enlarged portion 61 having an annular cylindrical side wall 61' which abuts against and lies flush with the interior presented annular surface of the casing 1. The cylindrical side wall 61' integrally includes an outwardly extending flange 62 which is sized for matching engagement with the flange 59 of the sheet metal stamping 50, and is also seated in the annular clamping ring 4, all as can best be seen in FIG. 5. The two sheet metal stampings 50, 60, together form a suitable control housing 63. By means of the above-outlined construction, it can be seen that each of the stampings 50, 60, will rotate with the outer casings 1, 2.

Disposed within and extending axially through the evaporator casing 1 is a stationary hollow support shaft 64 which is provided with a series of circumferentially spaced air-venting apertures 65. The forward end of the shaft 64 is journaled in bearings 66 which are, in turn, mounted in a dished-out portion $d$ of the sheet metal stamping 60. Rigidly secured to the left transverse end of the wire mesh evaporator casing 1 is a rearwardly and inwardly tapering solid left end wall 67 which integrally merges into a forwardly and inwardly tapering side wall 68. The side wall 68 is integrally formed with an annular flange 69 which is rigidly secured to a matching annular flange 70, the latter being welded or otherwise rigidly secured to the rearward end of the sheet metal stamping 60. The inwardly tapering side wall, 68 is radially slit to provide a series of radially spaced elongated apertures 71 and outwardly projecting air impeller blades 72, and when the evaporator casing 1 is rotating the impeller blades 72 and apertures 71 serve as an evaporator fan or blower 73 for drawing air from the media or compartment to be conditioned and into the evaporator E.

Disposed around and extending axially along the evaporator casing 1 is an outer cylindrical evaporator housing 74, which is stationary with respect to the evaporator casing 1, which includes a spirally shaped side wall 75 and which is turned upon itself to form a discharge port 76, the port 76 extending rearwardly of the side wall 75 in the provision of a discharge aperture 77. The side wall 75 further integrally merges into a left end wall 78. Mounted in the end wall 78 and extending on both sides thereof is an open ended tubular sleeve 79 which serves as an air-intake chamber 80, terminating inwardly of the housing 74 in a heat-exchange chamber 81. The discharge port 76 and the sleeve 79 are both sized to accommodate a standard rubber hose or pipe-fitting used in automotive vehicles and the like for connection to the passenger compartment or other media which is to be conditioned or cooled. The stationary shaft 64 and the outer evaporator housing 74 are rigidly secured to the mounting bar 8 by means of a clamp 82 which is secured to a support rod 83, the support rod 83 being, in turn, secured to the mounting bar 8.

The air to be conditioned is drawn from the passenger compartment or other media to be cooled (not shown), through an intake chamber 80 and into the heat-exchange chamber 81 by feans of the evaporator fan 73. The air then is blown around an evaporator heat-exchange coil or worm 84 which is mounted within the wire mesh evaporator casing 1. The rotation of the evaporator casing 1 and the fan 73 will cause the conditioned air which has passed over the heat-exchange coils 84 to be blown around the spiral casing wall 75 and into the discharge port 76 and will thereupon be blown through the discharge aperture 77 back into the passenger compartment.

While FIG. 5 shows the evaporator casing 1 with open air spaces between the various convolutions of the evaporator coil 84, it is contemplated that these air spaces can be loosely packed with a tightly woven metal wool such as aluminum, steel or copper wool. In this connection, it should be noted that the wool would be loosely packed within the casing 1 so that it would not impede the flow of air across the coils 84 and yet woven in a tightly adherent bundle so that fibers of the wool would not be blown through the wire mesh casing 1. It has been found that by packing the evaporator casing 1 with a metal wool, an air to metal, and then metal to metal heat transfer is made maintaining higher over-all heat transfer coefficients.

The liquid refrigerant in the heat-exchange coil 84, which has been evaporated to a gaseous state, is then deposited in a low-pressure gas chamber 85 formed by the sheet metal stamping 60 and the sheet metal stamping 18, all as can best be seen in FIG. 5. The chamber 85 communicates with the low-side manifold 47 through an aperture 86 formed in the stamping 60. The low-pressure gas in the manifold 47 is then drawn into the compressor 23 through the low-side inlet port 46. After the gaseous refrigerant has been compressed to condenser pressure, it is discharged through the discharge port 48 into the high-pressure gas manifold 49 where it is, in turn, carried into a condenser heat-exchange coil 87 which is mounted in and rotatable with the wire mesh condenser casing 2. While the condenser C is illustrated with open air spaces between the convolutions of the coil 87, it is also contemplated to pack these air spaces with a metal wool, such as in the case of the evaporator E. It should be understood that the metal wool would be loosely packed around the coil 87 so it would not impede air flow but would be tightly woven in order to prevent any of the metal wool strands from being carried out of the wire mesh casing 2 in the air flow.

Mounted on and rotatable with the right transverse end of the wire mesh condenser casing 2 is a right end wall 88 which is provided with an inwardly and rearwardly tapering side wall 89, the latter integrally merging into an annular flange 89' which is connected about and secured to the rotatable quill shaft 9. The inwardly tapering side wall 89 is radially slit to provide a series of radially spaced air-venting apertures 90 and outwardly projecting air-impeller blades 90', and when the condenser casing 2 is rotating the blades 90' and the apertures 90 serve as a condenser fan or blower 91. After the refrigerant is condensed to a liquid state in the coil 87, it is deposited in a high-side liquid refrigerant chamber 92 formed by the sheet metal stampings 19, 50, and the flange 21 integrally formed on the stamping 19.

In order to regulate the amount of liquid refrigerant which is supplied to the evaporator coil 84, the high-side liquid refrigerant chamber 92 is provided with a high-side liquid refrigerant control 93 which includes a pivot arm 94 pivotally mounted within a sleeve 95, the latter being integrally formed with a cylindrical valve housing 96 which is disposed within the low-side chamber 85 and rigidly secured to the flange 20, all as can best be seen in FIG. 9. The pivot arm 94 integrally merges into an upstanding float arm 97 having an enlarged head 98 which serves as a float. The pivot arm 94, the float arm 97, and the enlarged head 98 are axially bored to provide a liquid refrigerant passageway 99 which opens into the high-side chamber 92. Also rigidly secured to the pivot arm 94 and extending angularly outwardly therefrom with respect to the float arm 97 is a weight control arm 100 having a counterweight 101 mounted at its outer end for maintaining the float 98 within a buoyant condition within the high-side chamber 92. Disposed within the circular valve housing 96 and movable therein is a cylindrical valve block 102 which is retained by a housing end plate 103, the valve block 102 being rigidly secured to an extension of the pivot arm 94 and pivotal therewith. The valve block 102 is provided with a radial fluid duct 104 which is in constant communciation with the fluid passageway 99 and which is adapted to communicate with a liquid refrigerant line 105 through valve apertures 106 formed within the wall of the valve housing 96, when the pivot arm 94 is pivoted to the position as shown in FIGS. 8 and 9. The liquid refrigerant line 105 is connected to the high-side of the evaporator heat-exchange coil 84 for delivering fluid to the coil 84, when the liquid refrigerant is supplied to the high-side chamber 92 from a condenser return line 105'.

When the liquid chamber 92 is empty, the float or enlarged head 98 will cause the float arm 97 and the pivot arm 94 to pivot within the sleeve 95, thereby raising the counterweight 101. As this occurs, the valve block 102 will cause the fluid duct 104 to be rotated out of alignment with the valve apertures 106 and prevent communication between the evaporator coil 84 and the high-side chamber 92. However, as liquid refrigerant accumulates within the chamber 92, it will be propelled towards the peripheral wall thereof by the rotation of the casing 1. As this occurs, the float 98 which is lighter in weight because of the buoyant effect of the liquid will be buoyed upward to the position as shown in FIG. 8, thereby rotating the pivot arm 94, the valve block 102, and the fluid duct 104, causing the fluid duct 104 to come into alignment with the valve apertures 106 and thereupon fluid communication is maintained through the high-side chamber 92 and evaporator coil 84.

After the liquid refrigerant has evaporated from the evaporator coil 84, it is then deposited within the low-side chamber 85 where the gas will separate from any entrained liquid refrigerant and pass through the aperature 86 into the low-side inlet port 46 of the compressor 23. Any liquid refrigerant which has been entrained with the gas will collect on the walls of the sheet metal stamping 60 as the casing 1 rotates, and when sufficient liquid has accumulated therein, it will pass over an annular lip 107 and into the low-side chamber 85, the lip 107 being welded or otherwise rigidly secured to the diametrally enlarged portion 61 of the stamping 60.

In order to regulate the high-side pressure maintained in the entire system, the low-side chamber 85 is provided with a low-side refrigerant control 108 which includes a pivot arm 110 pivotally mounted within a sleeve 111, the latter being integrally formed with a cyclindrical valve housing 112 which is disposed within the high-side chamber 92 and rigidly secured to the extending flange 21, all as can best be seen in FIG. 11. The pivot arm 110 is integrally formed with a radially extending float arm 113 which integrally merges into an enlarged head 114 serving as a float. Also rigidly secured to the pivot arm 110 and extending outwardly therefrom at an angle with respect to the float arm 113 is a weight-control arm 115 and mounted on the end thereof is a counterweight 115'. The pivot arm 110 is axially bored to provide a high-pressure gas passageway 116. Disposed within the cylindrical valve housing 112 and retained therein by means of an end plate 117 is a cylindrical valve block 118 which is provided with a radial gas duct 119 and an axial duct 120 which maintains communication between the duct 119 and the gas passageway 116. By reference to FIG. 11, it can be seen that the valve block 118 is rigidly secured to an extension of the pivot arm 110 and pivotal therewith. When the pivot arm 110 and float 114 are pivoted to the position as shown in FIGS. 8 and 11, it can be seen that the high-pressure gas duct 119 communicates with the high-side chamber 92 through valve apertures 121 formed within the block 102. It can also be seen that the high-side control 93 and the low-side control 108 are located on diametrally opposite ends of the casing 1, that is to say they are separated in terms of circular measure around the casing 1 by 180°. A flash gas and oil line *l* is connected to and communicates with the portion of the high-side refrigerant line 105 within the low-side chamber 85 for removing gaseous refrigerant which has flashed in the high-side of the system such as the high-side chamber 92. The flash gas and oil line *l* extends inwardly and opens into the low-side chamber 85 above the level of the liquid refrigerant within the chamber 85. In this connection, it should also be noted that in order to maintain a full-flooded condition in the evaporator coil 84, the liquid refrigerant level in the low-side chamber 85 should be maintained slightly above the pivot arm 110 so that the high-pressure gas passageway 116 opens into the quantity of liquid refrigerant in the chamber 85.

When no liquid refrigerant has accumulated within the low-side chamber 85, the weight of the float 114 will tend to pivot the pivot arm 110 and carry therewith the valve block 118, causing the gas duct 119 to fall out of alignment with the valve apertures 121. However, when the low-pressure gas returning from the evaporator coil 84 contains entrained liquid refrigerant, this liquid refrigerant will accumulate within the low-side chamber 85. As the casing 1 rotates, the liquid will be propelled to the peripheral wall of the chamber 85, and when sufficient weight of liquid refrigerant has accumulated therein, the float 114 will be buoyed toward the peripheral wall of the casing 1 against the action of the counterweight 115'. Thereupon, the gas duct 119 will become aligned with the valve apertures 121 providing communication between the high-side chamber 92 and the low-side chamber 85, and thereby reducing the high-pressure on the high-side of the system.

Disposed within the stamping 60 and rigidly secured to the stub shaft 36 is an oil separator tube 122 for separating any oil which may be entrained with the liquid refrigerant. As the refrigerant is deposited within the stamping 60, it will be retained therein until a sufficient amount has accumulated to pass over the lip 107. The oil, which is immiscible with the liquid refrigerant and lighter than the liquid refrigerant, will form a film of oil on the upper portion thereof and will be deposited within the oil separator tube 122. The stub shaft 36, the rotor shaft 34, and the stationary shaft 5 are axially bored to provide an oil passageway 122' which provides lubrication to the bearings 31 and the bearings 37. A water condensate tube 123 is disposed within a water condensate reservoir 123' formed by a recess in the housing 74 and retained therein by a conventional nipple n. The condensate tube 123 terminates at its other end adjacent the condenser blower 91 and carries the condensed water into the rotating condenser C. Actually, the condensed water aids in the heat-exchange operation in the condenser C.

The temperature of the media to be conditioned such as the passenger compartment can be conveniently controlled by means of a temperature control 124 which is mounted within the heat-exchange chamber 81 and which is responsive to the temperature of the incoming air within the intake chamber 80. The temperature control 124 includes a spiral-type bimetallic thermostat 125 which is mounted on a sleeve 126 concentrically encircling, and being rotatable on the stationary shaft 64. Connected to the outer end of the bimetallic thermostat 125 is a pin 127 which is movable within an aperture 128 formed within an inwardly extending flange 129, the latter being integrally formed with an air director 130. The air director 130 is provided with an outwardly diverging wall 131 which, in turn, integrally merges into an annular side wall 131'. The air director 130 is also provided with a rearwardly extending flange f having a pair of upstanding guide fingers 132, the latter of which are movable in helical slots 132' formed within the peripheral wall of the sleeve 79. Thus, it can be seen that when the air passing the thermostat 125 is cool, the thermostat 125 will be in its expanded position and the fingers 132 will be at the lower end of the slots 132' and the air directer 130 will be in the "closed" position, that is the position shown in the solid lines of FIG. 5 where the forward margin of the annular side wall 131' will lie in facewise contact with the side wall 68. If the thermostat 125 should contract due to the passing of warm air, the pin 127 will rotate the air director 130 at the same time causing the fingers 132 to ride in the helical slots 132'. This will cause the air director 130 to move to its open position, that is the position as shown in the dotted lines of FIG. 5. Rigidly secured to the end wall 67 of the evaporator casing 1 and extending rearwardly therefrom is a solid coaxially extending evaporator casing 133 having an inwardly extending side wall 134 and which houses an auxiliary heat-exchange coil 135 which is, in turn, connected to the heat-exchange coil 84 by means of a capillary tube 136. The annular side wall 131' of the air director 130 is provided with an outwardly extending annular flange 137 which is to lie in flushwise engagement with the end wall 134 when the pin 127 is in the lower end of the elongated groove 128.

By reference to FIG. 5, it can be seen that when the air director 130 is in its forwardmost position, the auxiliary coil 135 is completely isolated from the evaporator coil 84 within the evaporator casing 1. When the incoming air in the chamber 80 is cold, the thermostat 125 will maintain its expanded position retaining the finger 132 at the lower end of the helical slot 132'. The air director 130 will then be positioned in its forwardmost position, that is at the position shown in FIG. 5, preventing any of the air from coming in contact with the auxiliary coil 135. However, if the air entering the intake chamber 80 should become warm, the bimetallic thermostat 125 will contract causing the finger 132 to move upward in the slot 132'. As this happens, the air director 130 will be moved to its rearward position, that is the position as shown in the dotted lines of FIG. 5, permitting the incoming air to come into heat-exchange contact with the auxiliary evaporator coil 135, and thereby provide additional cooling within the evaporator E. The liquid refrigerant which is supplied to the additional coil 135 by means of the capillary tube 136 and the evaporated refrigerant is returned to the low-side chamber 85 through a return line 138.

It is, of course, possible to maintain a desired predetermined temperature setting on the thermostat 125 by means of a suitable control mechanism 139 which includes an actuating rod 140 connected to the sleeve 126. A temperature control rod 141 is pivotally connected to the actuating rod 140 and can be suitably terminated in a control knob (not shown), which, of course, can be mounted in the passenger compartment. If the speed of the prime mover, such as the automobile engine, (not shown), should vary, the blower speed will fluctuate thereby producing fluctuations in the air velocity in the intake chamber 80 and the discharge port 77, and would ordinarily cause a fluctuation of temperature in the passenger compartment. Therefore, an air volume control 142 is mounted within the evaporator housing 74. The air volume control 142 includes a vertical shaft 143 which is pivotally mounted in the upper peripheral wall of the discharge port 76 and in the lower peripheral wall of the sleeve 79, substantially as shown in FIG. 5. Mounted on and movable with the shaft 143 within the intake chamber 80 is a flat circular balance vane or damper 144 which is movable responsive to the flow of air in the inlet chamber 80. Disposed within the discharge port 76 and mounted on the shaft 143 is a flat unbalanced vane or damper 145 which is angularly rotated approximately 45° with respect to the balance damper 144. Mounted on the shaft 143, intermediate the discharge port 76 and the intake chamber 80 is an actuating spring 146 which is connected at its upper end to a control sleeve 147, the latter being pivotally mounted on the shaft 143. The sleeve 147 is integrally provided with an extended flange 148 which is connected to a suitable control mechanism 149 mounted on the end wall 78. The control mechanism 149 includes an adjusting rod 150 which preferably extends into the passenger compartment and can be suitably provided with an air control adjusting knob (not shown). Thus, by means of this construction, it can be seen that the tension on the vertical shaft 143 can be maintained through control in the passenger compartment. The air which is blown into the intake chamber 80 by means of the evaporator fan 73 is blown across the balanced damper 144 and around the heat-exchange coils 84. As the evaporator casing 1 rotates, the air will be forced around the cylindrical evaporator housing 74 and into the discharge port 76, and will thereupon pass the unbalanced vane 145 and out through the discharge aperture 77. The conditioned air which is blown across the unbalanced vane 145 will tend to pivot the vane 145 and the shaft 143 so that the flat surfaces of the vane 145 are aligned with a plane parallel to the movement of the air in the discharge port 76. As the shaft rotates, the balanced vane 144 will tend to cut off the air coming through the intake chamber 80. The amount of angular movement of the shaft 143, however, can be regulated by a predetermined tension maintained on the actuating spring 146. Thus, the air blowing across the unbalanced vane 145 will tend to pivot the shaft 143 against the action of the actuating spring 146.

In use, the air-conditioning system A can suitably be mounted in any automotive vehicle and the V-belt pulley 12 connected to the automotive vehicile's engine by a conventional V-belt (not shown). Upon energization of the electromagnetic coil 17, the clutch ring 13 will be pulled into contact with the flywheel 16, and thereby establish mechanical connection between the pulley 12 and rotatable shaft 9.

Power will be transmitted through the rotatable shaft 9 causing the evaporator casing 1 and the condenser casing 2 to rotate therewith on each of the bearings 31, 37. By means of the above-outlined construction, it can be seen that the stationary support shaft 5 and the hollow support shaft 64 will support the rotatable casings 1, 2, on the mounting bar 8. The rotation of the quill shaft 9 will also cause the compressor casing 28 to rotate with respect to the stationary offset shaft 34. The rotation of the casing 28 will cause the low-pressure gaseous refrigerant within the low-pressure chamber 47 to be drawn into the low-pressure inlet port 46. The vane 41 will compress the gaseous refrigerant within the compressor 23 to condenser pressure, where the check-valve 51 will thereupon be forced open permitting the high-pressure gaseous refrigerant to pass through the discharge port 48 and into the high-pressure gas manifold 49. The check-valve 51 will prevent the compressor 23 from working against the high-side pressure during the whole refrigeration cycle. The operation of the compressor 23 is more fully described in the above-mentioned United States Letters Patent No. 3,001,384, and in co-pending application, Serial No. 102,060, filed April 10, 1961, and is, therefore, not fully described in detail herein. The gaseous refrigerant which has been pressurized to a point below its critical pressure is delivered to the condenser coil 87 where it is condensed to a liqiud state. The rotation of the condenser casing 2 will cause the blower or condenser blower 91 to draw air in through the air-venting apertures 90 and across the coil 87 in heat-exchange relationship. The air is then propelled outwardly of the wire mesh casing 2 during rotation thereof. The gaseous refrigerant, which has been pressurized to a point below its critical pressure, is condensed to a liquid state and deposited in the high-side liquid refrigerant chamber 92 through the high-side liquid refrigerant line 105'. As the liquid refrigerant accumulates within the high-side chamber 92, the refrigerant will be forced to collect along the peripheral wall of the chamber 92 due to the centrifugal force of the rotating casings 1 and 2. As a sufficient amount of liquid refrigerant accumulates within the chamber 92, the float 98 will be buoyed outwardly toward the peripheral wall and assume the position as shown in FIGS. 8 and 9. As the float 98 is buoyed upwardly, this will tend to pivot the pivot arm 94 and the valve block 102, thereby aligning the fluid duct 104 with the valve apertures 106. The liquid refrigerant in the chamber 92 will then pass through the liquid refrigerant passageway 99, through the duct 104, through the refrigerant line 105, and into the evaporator coil 84, causing a full-flooded condition in the evaporator E. If any of the liquid refrigerant in the high-side of the system such as in the high-side chamber 92 has boiled into its gaseous state, it will be carried with the liquid refrigerant into the line 105'. The gas will then pass through the flash gas and oil line l, bubble through the liquid refrigerant in the low-side chamber 85 and pass into the low-pressure gas manifold 47 where it will be recycled to the compressor 23. As the casings 1, 2, are rotating, the liquid in the line 105' will adhere to the outer portion of the wall and will not pass through the flash gas and oil line l. In this connection, it is also to be noted that as the liquid refrigerant produced in the condenser C is continually delivered to the high-side chamber 92, the condenser C will operate on a dry-wall basis.

The rotation of the evaporator casing 1 and the evaporator blower 73, carried therewith, will exhaust the air from the media to be conditioned and draw such air through the intake chamber 80. The air will then be blown across the heat-exchange coils 84 and the liquid refrigerant within the coils 84 will absorb the heat content of the air and thereupon expand into a gaseous state, while cooling the air to be recycled to the media from which it is drawn. The continued rotation of the evaporator casing 1 will cause the air to be blown around the outer housing 74 and into the outlet port 76, where it is recycled to the passenger compartment or other media.

The liquid refrigerant which has expanded in the evaporator heat-exchange coils 84 is then deposited in the low-side chamber 85 to be recycled through the compressor 23 and continue the above-mentioned refrigeration process. As long as the refrigerant returned to the low-side chamber 85 is entirely gas, the low-side control 103 will remain closed and prevent communication with the high-side chamber 92 through gas passageway 116 and the gas bypass ducts 119, 120. The net result is that the entire condensing system is maintained under high pressure and the liquid refrigerant is continually delivered to the evaporator E. However, if the low-pressure gas returned from the evaporator E contains any entrained liquid, this liquid will separate from the gas in the low-side chamber 85 permitting the gas to be drawn into the compressor 23, and permitting the liquid to collect in the peripheral wall of the low-side chamber 85. As the liquid refrigerant continually collects within the chamber 85 and is forced to the peripheral wall by the centrifugal force of the rotating casing 1, the float 114 will be buoyed toward the peripheral wall of the casing 1 permitting communication between the gas passageway 116 and the gas bypass duct 119, causing the alignment of the duct 119 with the valve apertures 121. This will, in effect, cause a reduction of the high-pressure in the high-side chamber 92, and as a result thereof, the back pressure on the condenser C will decrease causing less liquid to be delivered to the high-side chamber 92 and thus to the evaporator E. This flow of liquid refrigerant to the evaporator E will thence diminish until the evaporator E begins to run "cold."

As long as the condensed liquid from the condenser C is entirely a liquid, it will flow through the high-side liquid refrigerant line 105' into the chamber 92 and then to the evaporator coil 84 through the refrigerant line 105. However, if the condensed liquid returning from the condenser C contains any entrained gas, which may be due to a momentary overloading on the condenser C or to an increased load on the evaporator E, the system will then begin to run "gassy." The net effect will be a high-pressure gas build-up throughout the entire condensing system. This will, in effect, produce a higher degree of liquification of the refrigerant and thereby counteract gassy conditions by causing the high-side of the system to achieve a sufficient pressure increase which will increase condensation of the liquid refrigerant in the condenser C. Obviously, if the condenser C then begins to produce too much liquid refrigerant which is not used by the evaporator E, this liquid refrigerant will be deposited in the low-side chamber 85 causing a decrease in the pressure of the condensing system as described above.

The fluctuations in the speed of the prime mover which will cause changes in the speed of the evaporator blower 73 and the velocity of the air drawn into the evaporator E is compensated by the air volume control 142. Since the unbalanced vane 145 is rotated approximately 45° with respect to the balanced damper 144, the large quantity of air passing the balanced damper 144 will tend to align the flat faces of the damper 144 in planes parallel to the movement of the air and thereby pivot the balanced damper 144 to a partially closed position. If the vehicle is traveling at high speed, the blower 73 will draw large volumes of air from the passenger compartment and recycle such air at a high velocity. The balanced damper 144, which will be partially closed because of the predetermined tension maintained and set on the actuating spring 146, will tend to cut down the flow of air to the evaporator E. If the speed of the automotive vehicle is suddenly reduced, the blower 73 will rotate at a slower speed and draw less air into the passenger compartment. The unbalanced vane 145 will then tend to close the discharge port 76 because of the tension on the actuating spring 146. This will, in effect, open the balanced damper 144 permitting more air from the passenger compartment to flow into the evaporator E. Thus, it can be seen that the flow of air into and out of the passenger compartment is constantly regulated responsive to the speed of the prime mover, and will, in effect, maintain the air velocity of the passenger compartment constant irrespective of such engine speed.

The desired temperature of the passenger compartment can be accurately maintained by setting a predetermined temperature on the bimetallic thermostat 125. This is accomplished by regulation of the temperature control rods 140, 141. If the air drawn into the intake chamber 80 is cool, the bimetallic thermostat 125 will expand on the sleeve 126 causing the pin 127 to move downward and forward in the elongated slot 128. This will, in effect, move the air director 130 to its forwardmost position, reference being made to FIG. 5, until the forward margin of the annular side wall 131' abuts the side wall 68. This will, in effect, prevent the additional evaporator coils 135 from entering into the cooling media. However, if the air passing the bimetallic thermostat 125 is "warm," the thermostat 125 will contract on the sleeve 126 causing the fingers 132 to move rearwardly within the helical slots 132'. This will cause the air director 130 to move to its rearward position, that is the position as shown in the dotted lines of FIG. 5, permitting the air drawn into the evaporator E to pass over the additional heat-exchange coils 135. It can be seen that the addition of the extra heat-exchange coils 135 provides a greater degree of heat transfer-surface and, in effect, will cool the incoming air to a lower temperature. This incoming air is then recycled back to the passenger compartment as previously described. If, however, the air coming in from the passenger compartment is then too cool, this will cause the air director 130 to close the additional heat-exchange coils 135, thereby decreasing the heat-exchange surface and causing the air from the passenger compartment to be maintained at a steady temperature.

By means of the above-outlined construction, it can be seen that the high-side control 93 and the low-side control 108 are modulating in their operation and maintain the capacity of the evaporator E in balance with the load. The temperature control 124 further maintains a constant temperature within the passenger compartment and the air volume control 142 maintains a constant volume into and out of the passenger compartment, irregardless of the speed of the prime mover.

It should be understood that changes and modifications in the form, construction, arrangement, and combination of the several parts of the vehicle air-conditioning units may be made and substituted for those herein shown and described without departing from the nature and principle of my invention.

Having thus described my invention, what I claim and desire to secure by Letters Patent is:

1. An air-conditioning device for automotive vehicles and similar mobile devices having a compartment in which the condition of the air is to be maintained within a selected range, said device comprising an inner rotatable housing having an outer spirally shaped housing, a first stationary shaft extending into one end of said inner housing, a rotatable shaft disposed around and extending along said first stationary shaft, a compressor mounted on one end of said rotatable shaft and being rotatable therewith, a control device mounted on said compressor and being rotatable therewith, a rotatable condenser extending coaxially with said rotatable shaft and being secured to said control device, a second stationary shaft extending into the other end of said inner housing in coaxial relation to the first stationary shaft, an evaporator rotatably mounted on said second stationary shaft and being rigidly secured to said control device for rotation therewith, means for establishing a flow of air over the evaporator so that cooled air is delivered from the evaporator, and air-flow control means mounted within said housing and being stationary with respect to said rotatable evaporator, said air-flow control means being adapted to throttle the volume of air being delivered from the evaporator responsive to changes in the speed of rotation of the evaporator.

2. An air-conditioning device for automotive vehicles and similar mobile devices having a compartment in which the condition of the air is to be maintained within a selected range, said device comprising an outer rotatable housing, stationary shaft means extending into opposite ends of said housing, an evaporator disposed within said housing and being rotatably mounted on said shaft means, a compressor disposed within said housing and being rotatably mounted on said shaft means, a low-pressure gas chamber disposed within said rotatable housing between said compressor and said evaporator, a condenser rotatably mounted on said shaft means externally of said housing, a high-side liquid refrigerant chamber disposed within said rotatable housing between said condenser and compressor, control means disposed within said chamber and being rotatable with said evaporator, condenser, and compressor, said control means being operatively connected between said compressor, condenser, and evaporator for regulating the amount of liquid refrigerant delivered to the evaporator and the amount of gaseous refrigerant delivered to the compressor, and means operatively associated with said stationary shaft means for rotating said condenser, compressor, and evaporator with respect to said stationary shaft means.

3. An air-conditioning device for automotive vehicles and similar mobile devices having a compartment in which the condition of the air is to be maintained within a selected range, said device comprising an inner rotatable main housing having an outer spirally shaped housing, said outer housing having a somewhat centrally located intake port and a discharge port located on its peripheral wall, stationary shaft means extending into said inner housing from opposite ends thereof, an evaporator disposed within said housing and being rotatably mounted on said shaft means, a compressor disposed within said housing and being rotatably mounted on said shaft means, a low-pressure gas chamber disposed within said rotatable housing between said compressor and said evaporator, a condenser rotatably mounted on said shaft means externally of said housing, a high-side liquid refrigerant chamber disposed within said rotatable housing between said condenser and compressor, first control means disposed within said high-side liquid refrigerant chamber and being rotatable with said evaporator, condenser, and compresor, said first control means being operatively connected to said compressor, condenser, and evaporator for regulating the amount of liquid refrigerant delivered to the evaporator and the amount of gaseous refrigerant delivered to the compressor, second control means mounted within the low-pressure gas chamber for controlling the pressure differential between the evaporator and condenser responsive to the quantity of liquid refrigerant within the low-pressure gas chamber, and third control means operatively mounted within said intake and discharge ports for regulating the volume of the air discharged from the evaporator.

4. An air-conditioning device for automotive vehicles and similar mobile devices having a compartment in which the condition of the air is to be maintained within a selected range, said device comprising a rotatable inner housing having a spirally shaped outer housing, stationary shaft means extending into said inner housing from opposite ends, a rotatable shaft disposed around and extending along said stationary shaft means, a compressor cylinder mounted on one end of said rotatable shaft and being rotatable therewith, compression means carried by the stationary shaft means and being adapted for co-action with the compressor cylinder when the latter is rotated, control chamber means mounted on and rotatable with the compressor cylinder, said chamber means being subdivided into a low-pressure chamber and a high-pressure chamber, a wire mesh condenser frame rigidly secured to said control chamber means and being rotatable therewith, condenser heat-exchange means disposed in said condenser frame and being rotatable therewith, said condenser heat-exchange means being operatively connected to said high-pressure chamber, a control valve located in the high-pressure chamber, a wire mesh evaporator frame rigidly secured to said control chamber means on opposite sides thereof with respect to said condenser frame and being rotatable with said control chamber means, evaporator heat-exchange means disposed within said evaporator frame and being rotatable therewith, said evaporator heat-exchange means being operatively connected through said control valve to the high-pressure chamber, and means in the high-pressure chamber for actuating the control valve responsive to the level of liquid in the high-pressure chamber.

5. The air-conditioning device of claim 4 wherein the outer housing entirely encloses the evaporator, said outer housing having an air inlet port and an air outlet port, a shaft pivotally mounted in and extending between said inlet and outlet ports, a first vane disposed within said inlet port and being secured to said shaft for regulating the flow of incoming air, and a second vane disposed within the outlet port and secured to said shaft for regulating the flow of outgoing air, said first vane being mounted on said shaft in angular relation with respect to said second vane.

6. The air-conditioning device of claim 4 wherein the outer housing entirely encloses the evaporator, said outer housing having an air inlet port and an air outlet port, a shaft pivotally mounted in and extending between said inlet and outlet ports, a balanced damper disposed within said inlet port and being secured to said shaft for regulating the flow of incoming air, and an unbalanced damper disposed within the outlet port and secured to said shaft for regulating the flow of outgoing air, said balanced damper being mounted on said shaft in angular relation with respect to said unbalanced damper.

7. An air-conditioning device comprising stationary support means, a compressor rotatably mounted on said support means, a condenser rotatably mounted on said support means and being operatively connected to said compressor, an evaporator rotatably mounted on said support means and being operatively connected to said condenser and compressor, first normally closed valve means interposed between the condenser and evaporator, first dynamically reactive means operatively associated with the first valve means for opening said first valve means responsive to the quantity of liquid refrigerant between the condenser and evaporator and thereby regulating the amount of liquid refrigerant delivered to said evaporator, second normaly closed valve means interposed between the evaporator and the compressor, second dynamically reactive means operatively associated with the second valve means responsive to the quantity of liquid refrigerant flowing between the evaporator and compressor and thereby regulating the pressure on the high-side of the refrigeration system, an outer housing secured to said support means and enclosing said evaporator, and air control means operatively mounted in said housing for regulating the inflow and outflow of air to the evaporator.

8. An air-conditioning device comprising stationary support means, a compressor rotatably mounted on said support means, a condenser rotatably mounted on said support means and being operatively connected to said compressor, an evaporator rotatably mounted on said support means and being operatively connected to said condenser and compressor, first normally closed valve means interposed between the condenser and evaporator, first dynamically reactive means operatively associated with the first valve means for opening said first valve means responsive to the quantity of liquid refrigerant between the condenser and evaporator and thereby regulating the amount of liquid refrigerant delivered to said evaporator, second normally closed valve means interposed between the evaporator and the compressor, second dynamically reactive means operatively associated with the second valve means responsive to the quantity of liquid refrigerant flowing between the evaporator and compressor and thereby regulating the pressure on the high-side of the refrigerant system, an outer housing secured to said support means and enclosing said evaporator, air control means operatively mounted in said housing for regulating the inflow and outflow of air to the evaporator, and means responsive to the speed of the inflow of air for regulating said air control means.

9. An air-conditioning device comprising an outer housing, a stationary shaft extending through said housing, a rotatable shaft disposed around and extending along said first stationary shaft, a compressor mounted on one end of said rotatable shaft and being rotatable therewith, a control device mounted on said compressor and being rotatable therewith, a wire mesh condenser frame rigidly secured to said control device and being rotatable therewith, a condenser heat-exchange coil disposed in said condenser frame and being rotatable therewith, said condenser heat-exchange coil being operatively connected to said control device, first blower means mounted on one end of said condenser frame and being rotatable therewith, a wire mesh evaporator frame rigidly secured to said control device on opposite sides thereof with respect to said condenser frame and being rotatable with said control device, a first evaporator heat-exchange coil disposed within said evaporator frame and being rotatable therewith, said first evaporator heat-exchange coil being operatively connected to said control device, second blower means mounted on one end of said evaporator frame and being rotatable therewith, a second evaporator heat-exchange coil disposed within said evaporator frame, a housing enclosing said second evaporator heat-exchange coil, said housing having a movable wall, and means operatively connected to said movable wall for opening said movable wall responsive to the temperature of the incoming air so that the incoming air may pass said second heat-exchange coil.

10. An air-conditioning device comprising an outer housing, a stationary shaft extending through said housing, a rotatable shaft disposed around and extending along said first stationary shaft, a compressor mounted on one end of said rotatable shaft and being rotatable therewith, a control device mounted on said compressor and being rotatable therewith, a wire mesh condenser frame rigidly secured to said control device and being rotatable therewith, a condenser heat-exchange coil disposed in said condenser frame and being rotatable therewith, said condenser heat-exchange coil being operatively connected to said control device, first blower means mounted on one end of said condenser frame and being rotatable therewith, a wire mesh evaporator frame rigidly secured to said control device on opposite sides thereof with respect to said condenser frame and being rotatable with said control device, a first evaporator heat-exchange coil disposed within said evaporator frame and being rotatable therewith, said first evaporator heat-exchange coil being operatively connected to said control device, second blower means mounted on one end of said evaporator frame and being rotatable therewith, a second evaporator heat-exchange coil disposed within said evaporator frame, a housing enclosing said second evaporator heat-exchange coil, said housing having a movable wall, and a thermostat operatively connected to said movable wall for opening said movable wall responsive to the temperature of the incoming air so that the incoming air may pass said second heat-exchange coil.

11. An air-conditioning device comprising an outer housing, a stationary shaft extending through said housing, a rotatable shaft disposed around and extending along said first stationary shaft, a compressor mounted on one end of said rotatable shaft and being rotatable therewith, a control device mounted on said compressor and being rotatable therewith, a wire mesh condenser frame rigidly secured to said control device and being rotatable therewith, a condenser heat-exchange coil disposed in said condenser frame and being rotatable therewith, said condenser heat-exchange coil being operatively connected to said control device, first blower means mounted on one end of said condenser frame and being rotatable therewith, a wire mesh evaporator frame rigidly secured to said control device on opposite sides thereof with respect to said condenser frame and being rotatable with said control device, a first evaporator heat-exchange coil disposed within said evaporator frame and being rotatable therewith, said first evaporator heat-exchange coil being operatively connected to said control device, second blower means mounted on one end of said evaporator frame and being rotatable therewith, a second evaporator heat-exchange coil disposed within said evaporator frame, a housing enclosing said second evaporator heat-exchange coil, said housing having a movable wall, a thermostat operatively connected to said movable wall for opening said movable wall responsive to the temperature of the incoming air so that the incoming air may pass said second heat-exchange coil, and control means operatively connected to said thermostat for maintaining a predetermined temperature setting on said thermostat.

12. An air-conditioning device comprising an outer housing, a stationary shaft extending through said housing, a rotatable shaft disposed around and extending along said first stationary shaft, a compressor mounted on one end of said rotatable shaft and being rotatable therewith, a control device mounted on said compressor and being rotatable therewith, a wire mesh condenser frame rigidly secured to said control device and being rotatable therewith, condenser heat-exchange means disposed in said condenser frame and being rotatable therewith, said condenser heat-exchange means being operatively connected to said control device, a wire mesh evaporator frame rigidly secured to said control device on opposite sides thereof with respect to said condenser frame and being rotatable with said control device, first evaporator heat-exchange means disposed within said evaporator frame and being rotatable therewith, said evaporator heat-exchange means being operatively connected to said control device, second evaporator heat-exchange means disposed within said evaporator frame and being operatively connected to said first heat-exchange means, said second heat-exchange means being enclosed within a separate casing and separated from said first heat-exchange means, a movable wall operatively mounted on said evaporator frame and being adapted to open and close so that incoming air may pass over said second heat-exchange means, and thermostatic means operatively connected to said movable wall for opening and closing said movable wall responsive to the tempearture of the incoming air.

13. An air-conditioning device comprising an outer housing, a stationary shaft extending through said housing, a rotatable shaft disposed around and extending along said first stationary shaft, a compressor mounted on one end of said rotatable shaft and being rotatable therewith, a control device mounted on said compressor and being rotatable therewith, a wire mesh condenser frame rigidly secured to said control device and being rotatable therewith, condenser heat-exchange means disposed in said condenser frame and being rotatable therewith, said condenser heat-exchange means being operatively connected to said control device, a wire mesh evaporator frame rigidly secured to said control device on opposite sides thereof with respect to said condenser frame and being rotatable with said control device, first evaporator heat-exchange means disposed within said evaporator frame and being rotatable therewith, said evaporator heat-exchange means being operatively connected to said control device, second evaporator heat-exchange means disposed within said evaporator frame and being operatively connected to said first heat-exchange means, said second heat-exchange means being enclosed within a separate casing and separated from said first heat-exchange means, a movable wall operatively mounted on said evaporator frame and being adapted to open and close so that incoming air may pass over said second heat-exchange means, thermostatic means operatively connected to said movable wall for opening and closing said movable wall responsive to the temperature of the incoming air, and control means operatively connected to said thermostatic means for maintaining a predetermined temperature setting on said thermostatic means and thereby regulating the amount of opening and closing of said movable wall.

14. An air-conditioning device comprising an outer housing, a stationary shaft extending through said housing, a rotatable shaft disposed around and extending along said first stationary shaft, a compressor mounted on one end of said rotatable shaft and being rotatable therewith, a control device mounted on said compressor and being rotatable therewith, a wire mesh condenser frame rigidly secured to said control device and being rotatable therewith, a condenser heat-exchanger coil disposed in said condenser frame and being rotatable therewith, said condenser heat-exchange coil being operatively connected to said control device, first blower means mounted on one end of said condenser frame and being rotatable therewith, a wire mesh evaporator frame rigidly secured to said control device on opposite sides thereof with respect to said condenser frame and being rotatable with said control device, a first evaporator heat-exchange coil disposed within said evaporator frame and being rotatable therewith, said first evaporator heat-exchange coil being operatively connected to said control device, second blower mounted on one end of said evaporator frame and being rotatable therewith, a second evaporator heat-exchange coil disposed within said evaporator frame, a housing enclosing said second evaporator heat-exchange coil, said housing having a movable wall, a thermostat operatively connected to said movable wall for opening said movable wall responsive to the temperature of the incoming air so that the incoming air may pass said second heat-exchange coil, control means operatively connected to said thermostat for maintaining a predetermined temperature setting on said thermostat, an outer housing secured to said support means and enclosing said evaporator, said housing having an air inlet port and an air outlet port, a shaft pivotally mounted in and extending between said inlet and outlet ports, a first vane disposed within said inlet port and being secured to said shaft for regulating the flow of incoming air, and a second vane disposed within the outlet port and secured to said shaft for regulating the flow of outgoing air, said first vane being mounted on said shaft in angular relation with respect to said second vane.

15. An air-conditioning device comprising base means, a rotatable compressor, a rotatable condenser and a rotatable evaporator operatively mounted on said base means, a rotatable control casing operatively mounted on said base means and having a first chamber connected to the condenser, said control casing having a second chamber connected to the evaporator, normally closed valve means mounted within said first chamber, first float means mounted within said first chamber and being operatively connected to said first valve means, said first float means being adapted to open said first valve means responsive to the amount of liquid refrigerant in said first chamber, and second normally closed valve means mounted with said second chamber, second float means mounted within said second chamber and being operatively connected to said second valve means, said second float means being adapted to open said second valve means responsive to the amount of liquid refrigerant flowing between the evaporator and compressor and thereby regulating pressure within the first chamber and on the high-side of the system.

16. An air-conditioning device comprising base means, a rotatable compressor, a rotatable condenser and a rotatable evaporator operatively mounted on said base means, said evaporator having a main heat-exchange coil and an auxiliary heat-exchange coil; a rotatable control casing operatively mounted on said base means and having a first chamber connected to the condenser, said control casing having a second chamber connected to the evaporator, normally closed valve means mounted within said first chamber, first float means mounted within said first chamber and being operatively connected to said first valve means, said first float means being adapted to open said first valve means responsive to the amount of liquid refrigerant in said first chamber, second normally closed valve means mounted within said second chamber, second float means mounted within said second chamber and being operatively connected to said second valve means, said second float means being adapted to open said second valve means responsive to the amount of liquid refrigerant flowing between the evaporator and compressor and thereby regulating pressure within the first chamber and on the high-side of the system, means for causing air to flow over the main heat-exchange coil of the evaporator, means disposed over and around the auxiliary heat-exchange coil for normally preventing the air-flow from passing over said auxiliary heat-exchange coil, and control means operatively connected to said evaporator for causing the air-flow to pass over the auxiliary heat-exchange coil whenever the temperature of the air-flow exceeds a predetermined limit.

17. An air-conditioning device comprising base means, a rotatable compressor, a rotatable condenser and a rotatable evaporator operatively mounted on said base means; a rotatable control casing operatively mounted on said base means and having a first chamber connected to the condenser, said control casing having a second chamber connected to the evaporator, normally closed valve means mounted within said first chamber, first float means mounted within said first chamber and being operatively connected to said first valve means, said first float means being adapted to open said first valve means responsive to the amount of liquid refrigerant in said first chamber, second normally closed valve means mounted within said second chamber, second float means mounted within said second chamber and being operatively connected to said second valve means, said second float means being adapted to open said second valve means responsive to the amount of liquid refrigerant flowing between the evaporator and compressor and thereby regulating pressure within the first chamber and on the high-side of the system, third normally closed valve means operatively connected to said evaporator for regulating the amount of heat-exchange surface within said evaporator, and reactive means operatively connected to said third valve means and adapted to open said third valve means responsive to the temperature of the incoming air to said evaporator and thereby increase the heat-exchange surface in said evaporator.

References Cited in the file of this patent
UNITED STATES PATENTS

| | | |
|---|---|---|
| 2,229,500 | Goldsmith | Jan. 21, 1941 |
| 2,805,558 | Knight | Sept. 10, 1957 |
| 3,001,384 | Hanson | Sept. 26, 1961 |

FOREIGN PATENTS

| | | |
|---|---|---|
| 141,647 | Switzerland | Oct. 16, 1930 |